United States Patent
Chen

(10) Patent No.: US 10,712,107 B2
(45) Date of Patent: Jul. 14, 2020

(54) METHOD FOR WATER TEMPERATURE STEPLESS ADJUSTMENT OF PIPELINE WATER DISPENSER

(71) Applicant: DONGGUAN UNIVERSITY OF TECHNOLOGY, Dongguan, Guangdong (CN)

(72) Inventor: Baiman Chen, Guangdong (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 82 days.

(21) Appl. No.: 16/157,124

(22) Filed: Oct. 11, 2018

(65) Prior Publication Data
US 2020/0088483 A1 Mar. 19, 2020

(30) Foreign Application Priority Data
Sep. 14, 2018 (CN) .......................... 2018 1 1071437

(51) Int. Cl.
*F28F 27/02* (2006.01)
*B67D 1/00* (2006.01)
*B67D 1/08* (2006.01)

(52) U.S. Cl.
CPC ............ *F28F 27/02* (2013.01); *B67D 1/0043* (2013.01); *B67D 1/0857* (2013.01); *B67D 1/0884* (2013.01); *B67D 1/0895* (2013.01); *B67D 2210/00118* (2013.01)

(58) Field of Classification Search
CPC ..... F28F 27/02; B67D 1/0043; B67D 1/0857; B67D 1/0884; B67D 1/0895; B67D 2210/00118
See application file for complete search history.

(56) References Cited

U.S. PATENT DOCUMENTS

| | | | | |
|---|---|---|---|---|
| 5,956,965 A | * | 9/1999 | Watanabe ............ | B01D 5/0042 62/238.5 |
| 2010/0294804 A1 | * | 11/2010 | Dalchau ............... | B67D 1/0014 222/146.1 |
| 2013/0247770 A1 | * | 9/2013 | Wilder ................. | B67D 1/0021 99/281 |

FOREIGN PATENT DOCUMENTS

| | | | |
|---|---|---|---|
| CN | 202044115 U | * | 11/2011 |
| CN | 205493559 U | | 8/2016 |
| CN | 102389262 B | | 2/2017 |

* cited by examiner

*Primary Examiner* — Eric S Ruppert

(57) ABSTRACT

A method for water temperature stepless adjustment of pipeline water dispenser includes connecting a water inlet pipe, a heat exchanging sump, a heating sump, a heat exchanger, a refrigeration sump, and a water outlet pipe, in turn, to form water inlet and outlet pipelines of a water dispenser; configuring a plurality of motorized valves or magnetic valves; configuring a plurality of temperature sensors; configuring a PLC control system which is connected with the motorized valves or magnetic valves, the temperature sensors, the heating sump, the refrigeration sump; setting outlet water temperature and water capacity and controlling the motorized valves or magnetic valves, and the temperature sensors; and controlling the PLC control system to calculate and judge to supply water with desired temperature and desired capacity.

1 Claim, 3 Drawing Sheets

METHOD FOR WATER TEMPERATURE STEPLESS ADJUSTMENT OF PIPELINE WATER DISPENSER

RELATED APPLICATIONS

This application claims the benefit of Chinese Patent Application No. 201811071437.9 filed on Sep. 14, 2018, the contents of which are incorporated herein by reference.

FIELD OF THE INVENTION

The present invention relates to field of water dispensers, and more particularly to a method for water temperature stepless adjustment of pipeline water dispenser.

BACKGROUND OF THE INVENTION

Currently, water dispenser mainly includes purified water type and running water type. Purified water discharged from the water dispenser can be drunk directly, while running water discharged from the water dispenser is needed to be boiled up. Outlet water of the conventional water dispenser generally can be chosen from three temperature types including cool water, normal-temperature water and boiled water. However, water at any temperature between cool water and boiled water can't be obtained, which can't satisfy people's increasingly rich and demanding life. For example, water temperature for preparing milk powder, green tea and coffee is 50° C., 80° C. and 90° C. respectively, which can't be supplied by the conventional water dispenser directly.

To solve the above problems, a temperature adjustable water dispenser is developed. Chinese patent CN102389262B discloses a temperature adjustable water dispenser which can heat the water to a desired temperature quickly, but the water source must use purified water, which increases cost and may have the possibility of breeding bacteria in the water dispenser. Chinese patent CN205493559U discloses a rapid cooling water dispenser which uses a refrigeration device to quickly cool down the boiled water to the desired temperature. Such a refrigeration device includes a refrigeration chip or a compressed-refrigerating machine, which requires large energy consumption.

SUMMARY OF THE INVENTION

Regarding to the above issues for the conventional water dispenser, the present invention provides a method for water temperature stepless adjustment of pipeline water dispenser which can obtain desired outlet water temperature in a short time. The water dispenser is provided with a water inlet pipe that is connected with the running water, and the running water flows through a water filter and into a heat exchanging sump, then flows into a heating sump to be boiled up to generate boiled water and vapor which flow into a water vapor separator to separate the water and the vapor. Specifically, vapor is discharged out of the water dispenser, while the boiled water is divided into two branches, one of which flows through the heat exchanger and is stored by a cool water container, then is further cooled down by a refrigeration device Z1 to a preset temperature; another of which is mixed with the cool water from the cool water container at a heat control valve, so that the temperature of the water from the heat control valve can be optionally adjusted between the boiled water temperature and cool water temperature. Moreover, most of heat energy released in the heat exchanger is absorbed by the running water in the heat exchanging sump, which saves energy therefore.

The functions mentioned above are achieved by sending temperature data detected by sensors to a control processor, and controlling the switch of electric film heaters and the various valves (including the opening percentage). In addition, heating devices or heaters in the present invention can be quartz tubes with electric heating films or heating inner containers with electric heat rods. Specifically, quartz tubes with electric heating films can prevent water from boiling up repeatedly.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
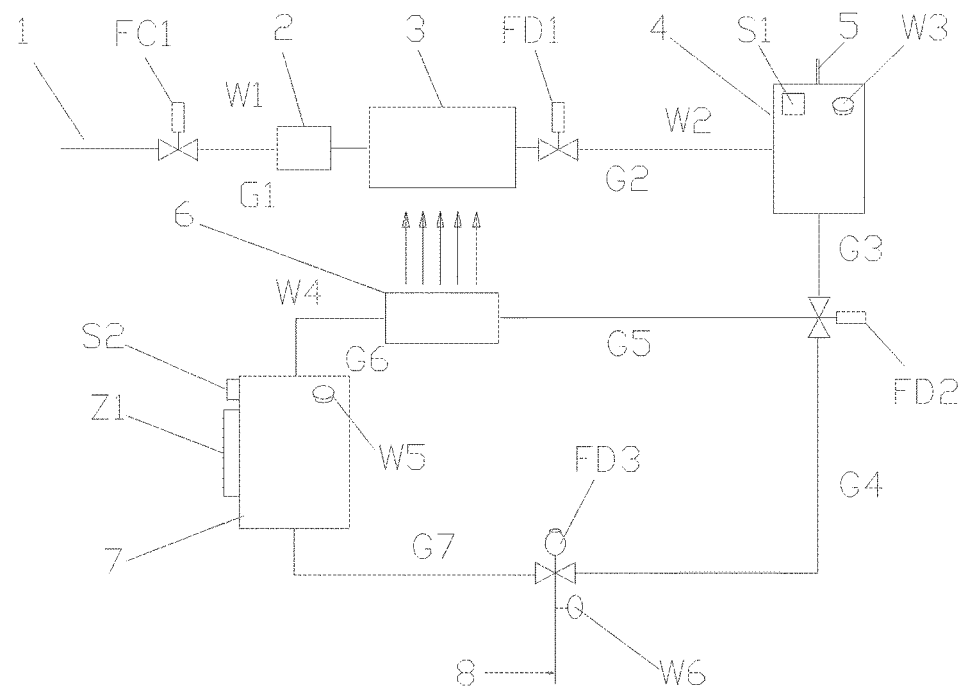
FIG. 1 is a schematic diagram of a water dispenser with water temperature stepless adjustment according to one embodiment of the present invention.
Figure 2:
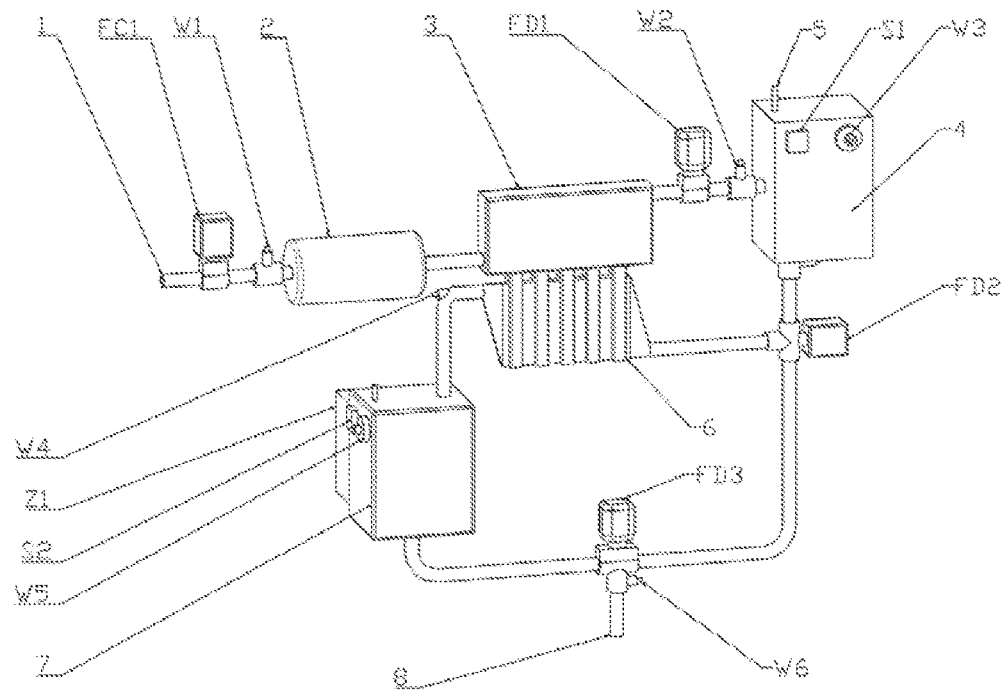
FIG. 2 is an internal perspective view of a water dispenser with water temperature stepless adjustment according to one embodiment of the present invention.
Figure 3:
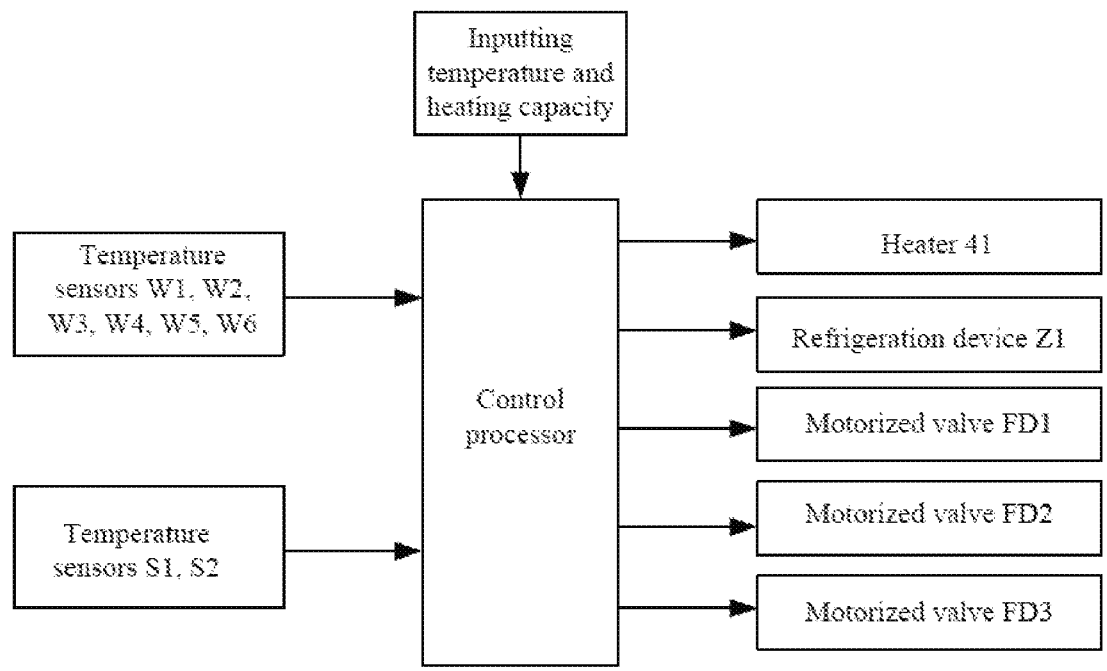
FIG. 3 is control diagram of a control system of the water dispenser with water temperature stepless adjustment according to one embodiment of the present invention.

A distinct and full description of the technical solution of the present invention will follow by combining with the accompanying drawings. By all appearances, the embodiments to be described just are a part of embodiments of the present invention, not the all. Based on the embodiment of the present invention, all other embodiments obtained by the person ordinarily skilled in the art without any creative work pertain to the protection scope of the present invention.

A First Embodiment

As shown in FIGS. 1-5, a method for water temperature stepless adjustment of pipeline water dispenser includes the following steps:

(1) connecting a water inlet pipe 1, a water filter 2, a heat exchanging sump 3, a heating sump 4, a heat exchanger 6, a refrigeration sump 7, and a water outlet pipe 8, in turn, to form water inlet and outlet pipelines G1, G2, G3, G4, G5, G6, G7 of a water dispenser;

(2) controlling water direction and water flow of the water inlet and outlet pipelines by configuring a plurality of motorized valves or magnetic valves; specifically, configuring a first motorized valve FD1 between the heat exchanging sump 3 and the heating sump 4, configuring a three-way motorized valve FD2 among the heating sump 4, the heat exchanger 6 and the water outlet pipe 8, and configuring a heat control valve FD3 between the refrigeration sump 7 and the water outlet pipe 8, thereby controlling the water in the water inlet and outlet pipelines. Specifically, water in the refrigeration sump 7 is refrigerated by a refrigeration device Z1.

(3) configuring a plurality of temperature sensors (W1, W2, W3, W4, W5, W6) for collecting water temperature data at positions of the water inlet pipe 1, an exit of the heat exchanging sump 3, an outer wall of the heating sump 4, an exit of the heat exchanger 6, an outer wall of the refrigeration sump 7, and the water outlet pipe 8, respectively;

(4) configuring a PLC control system which is connected with the motorized valves or magnetic valves, the temperature sensors (W1-W6), the heating sump 4, the refrigeration sump 7, so as to calculate and control working status of the water dispenser. Specifically, a temperature sensor S1 is configured in the heating sump 4, and another temperature sensor S2 is configured in the refrigeration sump 7.

(5) once the water dispenser is power on and started, and outlet water temperature (Wc) and water capacity (Lc) are set by users, controlling the system to turn on the first motorized valve FD1 and the second motorized valve FC1 to cause water to flow into the water inlet pipe 1, thereby the motorized valves or magnetic valves, the temperature sensors are controlled by the PLC control system; and (6) when the water flows through the pipeline sections G1 and G2, the water temperature at the position of the water inlet pipe is measured by the temperature sensor W1, and the calculation and judgment of the control system includes: on a basis of the outlet water temperature Wc and the water capacity Lc preset by the user, controlling the PLC control system to calculate a total heating capacity of the output water, and calculating another total heating capacity and water flow distribution for two branches of the water inlet and outlet pipelines, with a first branch is a straight pipeline (G3+G4), a second branch is a pipeline formed by the pipeline section G3, a heat exchanging pipe G5 and a refrigeration pipe (G6+G7).

Specifically, water can be controlled to discharge from different branches, based on the different outlet water temperature Wc and the water capacity Lc preset by the user.

Water Only Flowing Through the First Branch

In a preferable embodiment, water can be controlled to directly discharge from the first branch. If the user sets the outlet water temperature Wc as a high temperature range of 95° C.-100° C. and the water capacity Lc be smaller than a rated heating capacity Le for the heating sump 4, the second motorized valve FC1 and the first motorized valve FD1 are turned on, and the three-way motorized valve FD2 is turned off, the water will flow into the heating sump 4 and be heated by a heater 41 in the heating sump 4 to reach the preset capacity, temperature and duration. At this time, the first motorized valve FD1 will be turned off, and three-way motorized valve FD2 will be turned on to connect with the heat control valve FD3, therefore the hot water will flow through the pipeline sections G3 and G4 in turn, and reach the heat control valve FD3 to discharge from the water outlet pipe 8.

The temperature control in this embodiment is described as below. Firstly, water temperature at the positions of the heating sump 4 and the water outlet pipe 8 is sensed by the temperature sensors W3 and W6, and compared with the preset water temperature Wc; then the three-way motorized valve FD2, the heat control valve FD3 are adjusted, namely the water flow rate is adjusted, thus the water temperature and the water capacity desired by the user can be obtained by nature cooling of the pipelines or compensation pipelines.

Water Flowing Through the First and the Second Branches

Preferably, water can be controlled to flow through the first and the second branches, and finally discharged from the water outlet pipe 8 at the heat control valve FD3. Specifically, if the user sets the outlet water temperature Wc as a sub-high temperature range of 80° C.-95° C. and the water capacity Lc be smaller than a rated heating capacity Le for the heating sump 4, the three-way motorized valve FD2 is turned off, and the water under control by the first motorized valve FD1 will flow into the heating sump 4 and be heated to reach the preset capacity, temperature and duration. At this time, the first motorized valve FD1 will be turned off, and the three-way motorized valve FD2 will be turned on to connect with the heat control valve FD3 and the heat exchanger 6, so that hot water is generated at both of the first branch and the second branch, one of which flows through the pipeline G5 and into the heat exchanger 6 to exchange with the low-temperature water in the heat exchanging sump 3, another of which flows through the pipeline G4 and reaches the heat control valve FD3 to discharge from the water outlet pipe 8.

The temperature control in this embodiment is described as below. Firstly, water temperature at the positions of the heating sump 4, the heat exchanger 6 and the water outlet pipe 8 is sensed by the temperature sensors W3, W4 and W6, and compared with the preset water temperature Wc; then the three-way motorized valve FD2 and the heat control valve FD3 are adjusted, namely the water flow rate at each branch is adjusted, thus the water temperature and the water capacity desired by the user can be obtained by nature cooling of the pipelines or compensation pipelines.

Water Only Flowing Through the Second Branch

Preferably, water can be controlled to flow through the second branches G5 to exchange heat, and finally discharged from the water outlet pipe 8 at the heat control valve FD3. Specifically, if the user sets the outlet water temperature Wc as a medium-high temperature range of 40° C.-80° C. and the water capacity Lc be smaller than the rated heating capacity Le for the heating sump 4, the three-way motorized valve FD2 is turned off, and the water under control by the first motorized valve FD1 will flow into the heating sump 4 and be heated to reach the preset capacity, temperature and duration. At this time, the first motorized valve FD1 will be turned off, and the three-way motorized valve FD2 will be turned on to connect with the heat exchanger 6, so that hot water flows through the pipeline G5 and into the heat exchanger 6 to exchange with the low-temperature water in the heat exchanging sump 3, then the water flows through the pipelines G6 and G7 and reaches the heat control valve FD3 to finally discharge from the water outlet pipe 8.

Water Only Flowing Through the Second Branch

Preferably, water can be controlled to flow through the second branches G5 to exchange heat, then flow through the pipeline G6 to refrigerate, and finally flow through the pipeline G7 to discharge from the water outlet pipe 8 at the heat control valve FD3. Specifically, if the user sets the outlet water temperature Wc as a medium-low temperature range of 5° C.-40° C. and the water capacity Lc be smaller than the rated heating capacity Le for the heating sump 4, the three-way motorized valve FD2 is turned off, and the water under control by the valve FD1 will flow into the heating sump 4 and be heated to reach the preset capacity, temperature and duration. At this time, the first motorized valve FD1 will be turned off, and the three-way motorized valve FD2 will be turned on to connect with the heat exchanger 6, so that hot water flows through the pipeline G5 and into the heat exchanger 6 to exchange with the low-temperature water in the heat exchanging sump 3, then the water flows through the pipelines G6 and reaches the refrigeration sump 7 to cool down, and finally reaches the heat control valve FD3 to discharge from the water outlet pipe 8.

It should be noted that, if the user sets the water capacity Lc be larger than the rated heating capacity Le for the heating sump 4, the step (6) of calculating and judging is repeated until the desired water capacity is obtained.

Figure 4:
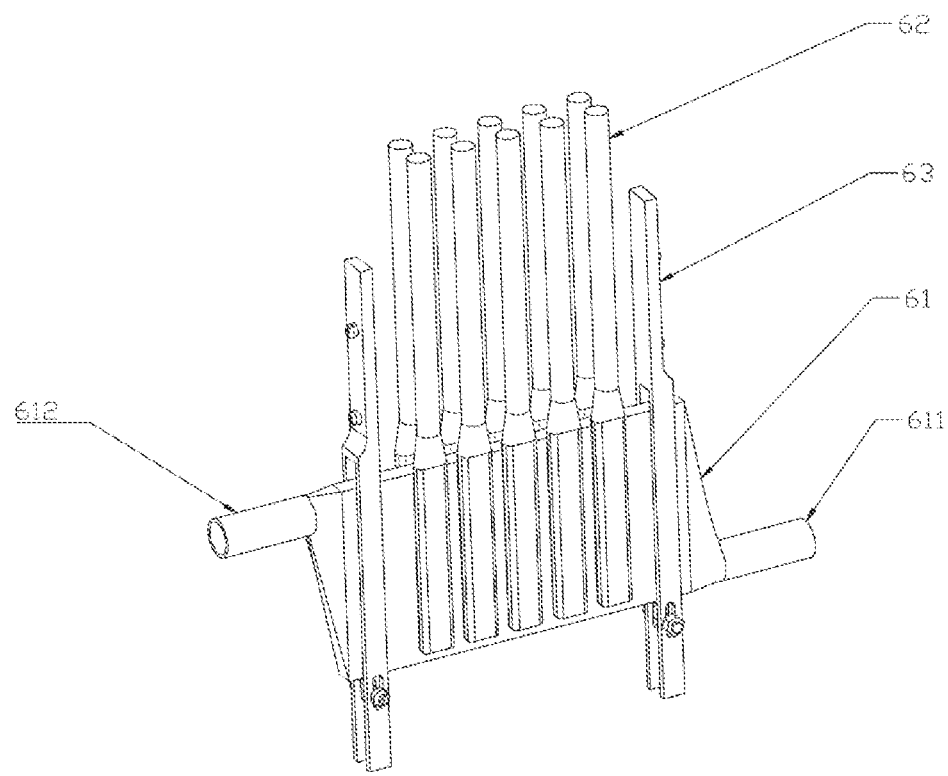
FIG. 4 is a perspective view of a heat exchanger of the water dispenser with water temperature stepless adjustment according to one embodiment of the present invention.
Figure 5:
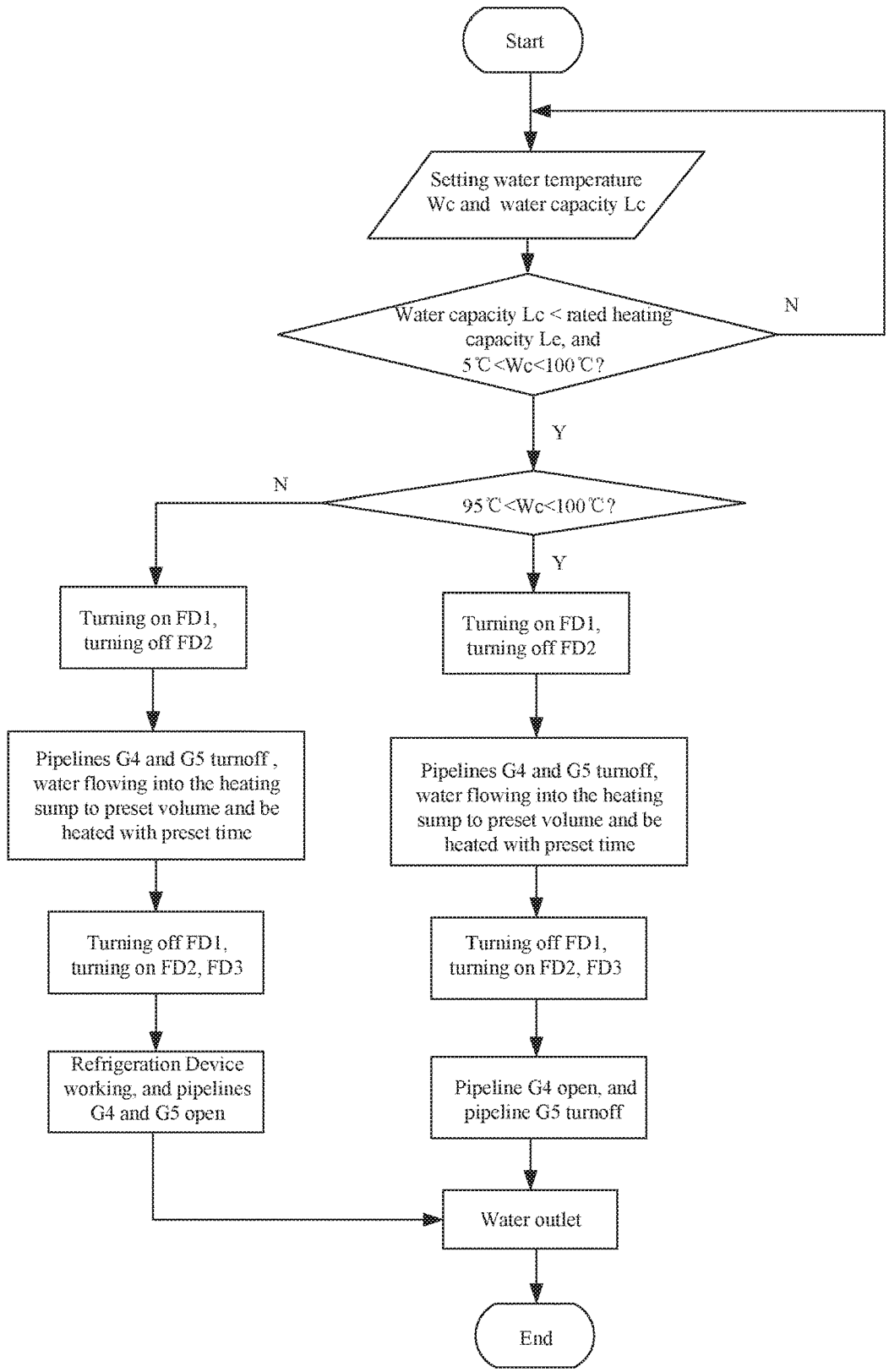
FIG. 5 is a flowchart of a method for adjusting temperature of the water dispenser with water temperature stepless adjustment according to one embodiment of the present invention.

As shown in FIG. 4, the heat exchanger of the water dispenser includes an exchanging cavity 61, and a fixing plate 63 for fixing the exchanging cavity 61. The exchanging cavity 61 provides an entry end 611 connected with the three-way motorized valve FD2, an exit end 612 connected with the refrigeration sump 7 and a backflow end 62 intercommunicated with the heat exchanging sump 3.

While the invention has been described in connection with what are presently considered to be the most practical and preferable embodiments, it is to be understood that the invention is not to be limited to the disclosed embodiments, but on the contrary, is intended to cover various modifications and equivalent arrangements included within the spirit and scope of the invention.

What is claimed is:

1. A method for water temperature stepless adjustment of pipeline water dispenser, comprising steps of:
   (1) connecting a water inlet pipe, a heat exchanging sump, a heating sump, a heat exchanger, a refrigeration sump, and a water outlet pipe, in turn, to form water inlet and outlet pipelines (G1-G7) of a water dispenser;
   (2) controlling water direction and water flow of the water inlet and outlet pipelines by configuring a first motorized valve (FD1) between the heat exchanging sump and the heating sump, configuring a three-way motorized valve (FD2) among the heating sump, the heat exchanger and the water outlet pipe, and configuring a heat control valve (FD3) between the refrigeration sump and the water outlet pipe;
   (3) configuring a plurality of temperature sensors including a first temperature sensor to a sixth temperature sensor (W1-W6) for collecting water temperature data at positions of the water inlet pipe, an exit of the heat exchanging sump, the heating sump, an exit of the heat exchanger, the refrigeration sump, and the water outlet pipe, respectively;
   (4) configuring a PLC control system which is connected with the first motorized valves (FD1) and the three-way motorized valve (FD2), the temperature sensors, the heating sump, the refrigeration sump, so as to calculate and control working status of the water dispenser;
   (5) once the water dispenser is power on and started, and outlet water temperature (Wc) and water capacity (Lc) are set by users, controlling to turn on the first motorized valve (FD1) and a second motorized valve (FC1) to cause pipeline pressure water to flow into the water inlet pipe, thereby the first motorized valves (FD1) and the three-way motorized valve (FD2), and the temperature sensors being under control;
   (6) when water flows through a first section and a second sections of the water inlet and outlet pipelines (G1 and G2), measuring water temperature at a position of water inlet pipe by means of the first temperature sensor (W1), and controlling the PLC control system as follows: on a basis of the outlet water temperature (Wc) and the water capacity (Lc), controlling the PLC control system to calculate a total heating capacity of output water, and calculating another total heating capacity and water flow distribution for two branches of the water inlet and outlet pipelines, with a first branch is a straight pipeline formed by a third and fourth sections of the water inlet and outlet pipelines (G3+G4), a second branch is a pipeline formed by the third section of the water inlet and outlet pipelines (G3), a heat exchanging pipe (G5) and a refrigeration pipe (G6+G7);

controlling water to be discharged from the first branch as follows:

setting the outlet water temperature (Wc) as a high temperature range of 95° C.-100° C. and setting the water capacity (Lc) as being smaller than a rated heating capacity (Le) for the heating sump, turning on the second motorized valve (FC1) and the first motorized valve (FD1) and turning off the three-way motorized valve (FD2), causing the water to flow into the heating sump and be heated to reach the outlet water temperature and the water capacity that are preset; then turning off the first motorized valve (FD1) and turning on the three-way motorized valve (FD2) to connect with the heat control valve (FD3), so that hot water flows through the third and the fourth sections of the water inlet and outlet pipelines (G3, G4) in turn, and reaches the heat control valve (FD3) to discharge from the water outlet pipe;

controlling the water temperature as follows: sensing water temperature at positions of the heating sump and the water outlet pipe by the third and the sixth temperature sensors (W3, W6), and comparing the water temperature with the outlet water temperature (Wc) that is preset;

adjusting the three-way motorized valve (FD2) and the heat control valve (FD3) thereby obtaining the outlet water temperature and the water capacity desired by the user by naturally cooling pipelines or compensation pipelines;

controlling water to flow through the first and the second branches and to be discharged from the heat control valve (FD3) as follows: setting the outlet water temperature (Wc) as a sub-high temperature range of 80° C.-95° C. and setting the water capacity (Lc) as being smaller than the rated heating capacity (Le) for the heating sump, turning off the three-way motorized valve (FD2), causing the water under control by the first motorized valve (FD1) to flow into the heating sump and be heated to reach the outlet water temperature and the water capacity that are preset; then turning off the first motorized valve (FD1) and turning on the three-way motorized valve (FD2) to connect with the heat control valve (FD3) and the heat exchanger, so that hot water is generated at both of the first branch and the second branch, one of which flows through the heat exchanging pipe (G5) and into the heat exchanger to exchange with low-temperature water in the heat exchanging sump, another of which flows through the fourth section of the water inlet and outlet pipelines (G4) and both reaches the heat control valve (FD3) to discharge from the water outlet pipe;

controlling the water temperature as follows: sensing water temperature at positions of the heating sump, the heat exchanger, and the water outlet pipe by the third, the fourth and the sixth temperature sensors (W3, W4, W6), and comparing the water temperature with the outlet water temperature (Wc) that is preset; adjusting the three-way motorized valve (FD2) and the heat control valve (FD3) thereby obtaining the outlet water temperature and the water capacity desired by the user by naturally cooling pipelines or compensation pipelines;

controlling water to flow through the second branch and to be discharged from the heat control valve (FD3) as follows: setting the outlet water temperature (Wc) as a medium-high temperature range of 40° C.-80° C. and setting the water capacity (Lc) as being smaller than the rated heating capacity (Le) for the heating sump, turning off the three-way motorized valve (FD2), causing the water under control by the first motorized valve (FD1) to flow into the heating sump and be heated to reach the outlet water temperature and the water capacity that are preset;

then turning off the first motorized valve (FD1) and turning on the three-way motorized valve (FD2) to connect with the heat exchanger, so that hot water flows through the heat exchanging pipe (G5) and into the heat exchanger to exchange with low-temperature water in the heat exchanging sump, then flows through the refrigeration pipe (G6+G7) and reaches the heat control valve (FD3) to finally discharge from the water outlet pipe;

controlling water to flow through the second branch and the refrigeration pipe (G6+G7), and to be discharged from the heat control valve (FD3) as follows: setting the outlet water temperature (Wc) as a medium-low temperature range of 5° C.-40° C. and setting the water capacity (Lc) as being smaller than the rated heating capacity (Le) for the heating sump, turning off the three-way motorized valve (FD2), causing the water under control by the first motorized valve (FD1) to flow into the heating sump and be heated to reach the outlet water temperature and the water capacity that are preset; then turning off the first motorized valve (FD1) and turning on the three-way motorized valve (FD2) to connect with the heat exchanger, so that hot water flows through the heat exchanging pipe (G5) and into the heat exchanger to exchange with low-temperature water in the heat exchanging sump, then flows through the refrigeration pipe (G6+G7) and reaches the heat control valve (FD3) to finally discharge from the water outlet pipe; and repeating the step (6) until a desired water capacity is obtained, if the water capacity (Lc) is set as be larger than the rated heating capacity (Le) for the heating sump.

* * * * *